(12) United States Patent
Smith

(10) Patent No.: US 6,659,754 B1
(45) Date of Patent: Dec. 9, 2003

(54) INJECTION MOLDING DEVICE

(75) Inventor: Keith A. Smith, Tampa, FL (US)

(73) Assignee: Cold Injection Molding, L.T.D., Tampa, FL (US)

( * ) Notice: Subject to any disclaimer, the term of this patent is extended or adjusted under 35 U.S.C. 154(b) by 37 days.

(21) Appl. No.: 10/118,182

(22) Filed: Apr. 8, 2002

(51) Int. Cl.[7] .................................................. B29B 3/00
(52) U.S. Cl. ..................................... 425/174.8; 425/543
(58) Field of Search ........................... 425/174.8 E, 543

(56) References Cited

U.S. PATENT DOCUMENTS

| | | | |
|---|---|---|---|
| 3,765,975 A | 10/1973 | Hollingsworth | |
| 3,873,661 A | 3/1975 | Kontz | |
| 3,930,600 A | 1/1976 | Gardner | |
| 4,165,062 A | 8/1979 | Mitchell | |
| 4,385,015 A | 5/1983 | Klettke | |
| 4,392,804 A | * 7/1983 | Pushee et al. | 425/174.8 E |
| 4,419,305 A | 12/1983 | Matles | |
| 4,537,737 A | 8/1985 | Crowe | |
| 4,632,672 A | 12/1986 | Kvitrud | |
| 4,787,436 A | 11/1988 | Ozeki et al. | |
| 4,987,946 A | 1/1991 | Van Riet | |
| 4,987,947 A | 1/1991 | Ozeki et al. | |
| 4,997,026 A | 3/1991 | Ozeki et al. | |
| 5,279,491 A | 1/1994 | Van Ackeren | |
| 5,587,183 A | 12/1996 | Clark et al. | |
| 5,770,245 A | 6/1998 | Takizawa et al. | |
| 5,858,416 A | * 1/1999 | Sochtig et al. | 425/543 |
| 5,865,803 A | 2/1999 | Major | |
| RE36,413 E | 11/1999 | Clark et al. | |
| 5,997,783 A | 12/1999 | Hunter et al. | |
| RE36,572 E | 2/2000 | Clark et al. | |

FOREIGN PATENT DOCUMENTS

JP         57015943         1/1982

* cited by examiner

Primary Examiner—Tim Heitbrink
(74) Attorney, Agent, or Firm—David W. Pettis, Jr., P. A.

(57) ABSTRACT

In an injection molding device used to inject a thermoset casting resin into a mold wherein the device includes a source of resin, a mold for receiving and curing the resin, a delivery vessel for injecting the resin into the mold, and a conduit in fluid communication between the mold and the delivery vessel, the improvement being a uniquely-configured piston for injecting the resin wherein the moveable end of the piston ram is substantially cone-shaped with the vertex of the ram cone extending toward the distal end of the ram body from which the casting resin is injected through the conduit into the mold. The interior, distal end of the ram body is also substantially cone-shaped, with the vertex of the body cone extending inwardly in opposed relation to the ram cone. In addition, the improvement is characterized by the construction of the outer body of the piston from plastic and by covering the exposed surface of the ram cone with rubber, whereby static electricity is generated as the ram cone advances toward the body cone, such that gas bubbles existing within the resin will be attracted to the plastic material forming the body, away from the delivery aperture formed through the body distal end.

8 Claims, 3 Drawing Sheets

INJECTION MOLDING DEVICE

BACKGROUND OF INVENTION

1. Field of the Invention

The present invention relates to an improved injection molding device whereby a thermoset casting resin can be injected into a mold at ambient temperature while substantially eliminating the injection of any gas bubbles into the mold, which would necessarily affect the quality of a finished product. The thermoset casting resin is injected into the mold by a piston having unique characteristics of construction and fiscal properties such that gas bubbles typically formed when one mixes resin with its associated activator are attracted to the sides of the piston body, away from the resin delivery aperture. In addition, the inside distal end of the piston body and the opposed distal end of the ram operatively mounted within the body are uniquely configured to enhance the gas-capturing tendency that results from a static electricity charge generated as the rubber-covered ram distal end moves against the plastic outer body.

2. Description of the Prior Art

The manufacturer of a wide variety of articles and parts by plastic injection molding is, of course, old and well-known. Very broadly stated, when one desires to mold parts from a plastic material and requires that the appearance and accuracy of the final product be of high-quality, rather expensive tool and die metal molds must be prepared for the injection of hot, melted plastic material into the mold. Such a hot injection molding process actually injects melted plastic material into the mold. While extremely high quality articles and parts may be manufactured using hot injection molding, the relative cost of the item being made is substantially determined by the number of items being made due to the expense of the mold and the apparatus necessary to melt the plastic and inject it into the mold. Thus, one encounters significant economic barriers if it is desired to injection mold only a small number of high quality parts.

Of course, articles and parts may also be molded from thermoset casting resins which comprise a mixture of resin and activator, or catalyst. Upon mixing the resin and catalyst in accord with the manufacturer's instructions, one obtains a flowable thermoset resin that will "harden" in a predetermined period of time which is determined by the nature of the resin and its associated activator. However, the chemical reaction which takes place upon mixing the thermoset resin and its activator generates a gas which can become trapped in the thermoset resin as bubbles, and when such material is placed into a mold, the resulting product is frequently unacceptable because of bubbles trapped within the article as it cures, or because of surface blemishes resulting from the presence of bubbles along the surfaces of the mold. Thus, the use of thermoset casting resin for the manufacture of high quality articles and parts, both in terms of physical appearance and strength, has not achieved commercial success. In fact, the practical use of thermoset casting resins today is substantially limited to application by brushing, spraying, or pouring into a mold. None of these procedures and related apparatuses are capable of yielding articles and parts of consistent high quality.

It is therefore clear that a need exists for an injection molding device designed and constructed so that thermoset casting resin can be injected into a mold at ambient temperature such that bubbles of gas do not enter the mold to the detriment of the appearance and physical characteristics of the end product.

SUMMARY OF THE INVENTION

The present invention relates to a device for injecting a thermoset casting resin into a mold at ambient temperature while substantially preventing the introduction of gas bubbles into the mold. The device of this invention includes a source of resin, a mold for receiving and curing the resin, a delivery vessel for injecting the resin into the mold, and a conduit in fluid communication between the mold and the delivery vessel. The improvement of this invention comprises the construction of the delivery vessel as a piston having an outer body formed from plastic and a moveable ram operatively disposed for reciprocal movement within the outer body. The outer body has a distal end including an aperture formed therethrough in fluid-communicating relation to the conduit which will deliver the thermoset casting resin to the mold. The moveable ram has a distal end in opposed relation to the body distal end, and the ram distal end defines a convex surface, hereinafter referred to as a ram cone, having its vertex in opposed relation to the body distal end. A surface of the ram cone is preferably formed of rubber, whereby static electricity is generated as the ram cone advances toward the body distal end to deliver the thermoset casting resin into the mold. The static electricity thus generated attracts gas bubbles existing within the resin toward the outer body, away from the delivery aperture. For the purpose of further enhancing the effective capture of gas bubbles along the piston outer body, the distal end of the body also defines a convex surface, hereinafter referred to as a body cone, having its vertex disposed in opposing relation to the ram cone vertex, with the delivery aperture extending through the vertex of the body cone.

By virtue of this construction, as shown in the accompanying drawings and as more fully set forth below, gas bubbles contained within the casting resin are not only attracted to the piston's outer body, but also tend to remain within the piston inasmuch as casting resin is actually injected into the mold through the aperture formed in the vertex of the ram cone. In effect, a volume of casting resin and "captured" gas bubbles will remain inside the piston and not be expelled through the delivery aperture because of the opposed convex surfaces defined by the ram cone and the body cone. Virtually all gas bubbles are captured in this volume and not injected into the mold.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION OF THE INVENTION

Figure 1:
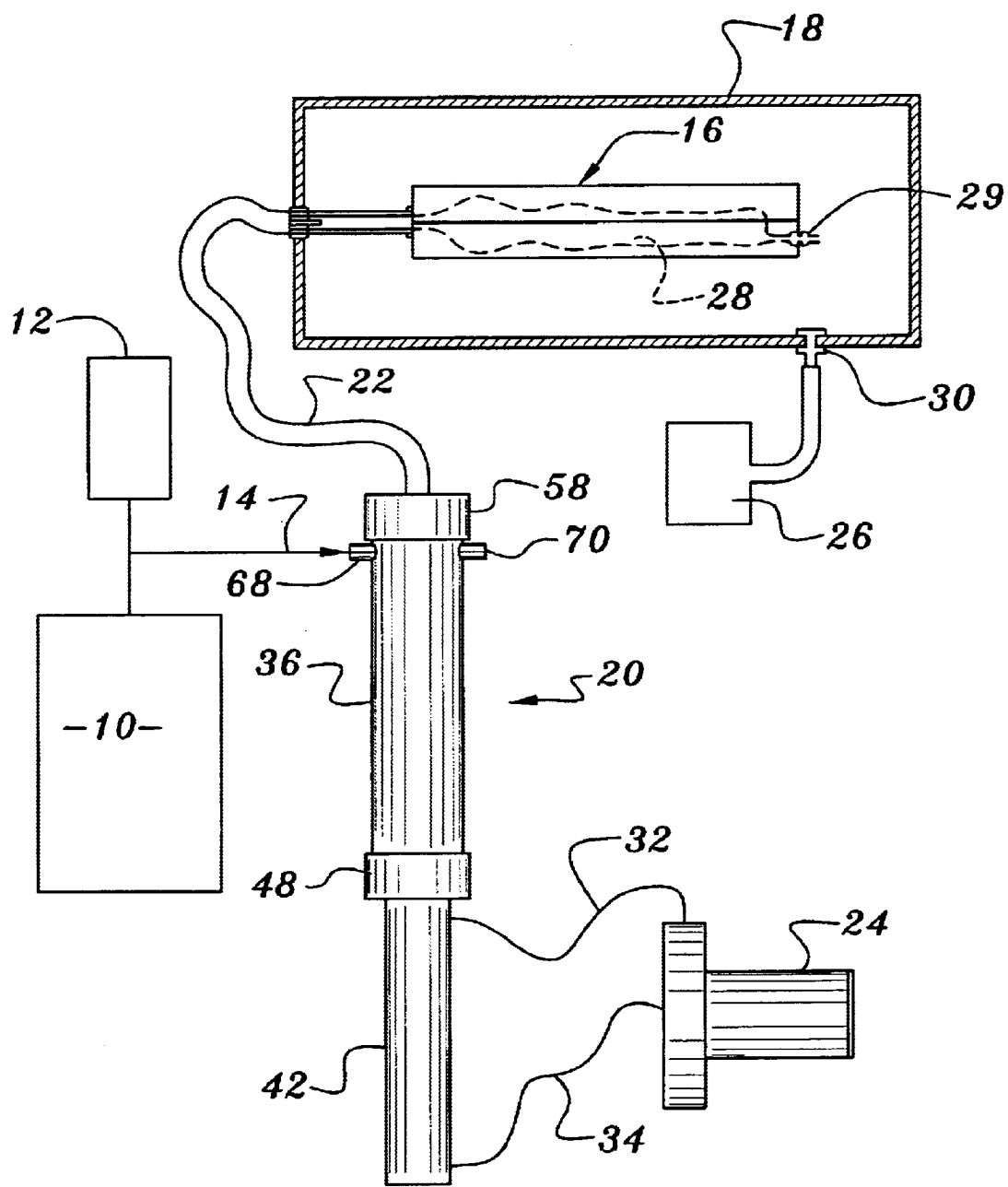
FIG. 1 is a plan view, partially in section, showing a first embodiment of the invention.

The present invention relates to an improved device for injecting a thermoset casting resin into a mold at ambient temperature. The improvement basically comprises a uniquely-constructed delivery vessel, in the form of a piston, for injecting the resin into the mold defining the article to be made. However, it is first be understood that the present invention is directed to the field of cold injection molding as opposed to the more common hot injection molding process used to form plastic parts of high quality. Utilizing the improved device of this invention, it has been determined that plastic articles and parts may be formed in virtually any shape and configuration in an extremely economical manner, even when only a few parts are being manufactured. This is the result of molding the parts with thermoset casting resin, rather than "melted" plastic, and the fact that the molds used in this cold injection process are much easier and less expensive to manufacture and maintain than are the molds and dies used in current hot injection molding systems. Thus, the innovative delivery vessel of this invention permits the manufacture of articles and parts of extremely high quality at a remarkably low price in smaller production quantities. One particular utility for the device of this invention, for example and certainly not as any limitation to the scope of the invention, is the manufacture of parts formed of plastic for the automotive industry. In fact, experimentation has shown that the device of this invention is particularly useful for the economical manufacture of replacement parts for classic automobile restoration.

Inasmuch as this invention is intended for use for injecting a thermoset casting resin into a mold at ambient temperature, a brief explanation of such resins follows. Thermoset casting resins basically comprise two parts: the resin, and an activator, or catalyst, which is added to the resin just prior to its injection into the mold, resulting in a chemical reaction between the two components such that the resin will harden or cure in a predetermined period of time. As this reaction takes place between the resin and the activator, gas bubbles are generated, and the presence of these bubbles within the resin is a primary reason that high quality parts have not heretofore been feasible with a cold injection molding system.

While a wide variety of thermoset casting resins are known and available for use in combination with the device of invention, their general characteristics are quite similar. The resins themselves are typically polyesters, urethanes, and/or epoxies by way of example only. One such thermoset casting resin is sold under the brand name Crystal Clear and manufactured by Smooth-On, Inc., of Easton, Pa. This product is generally described as a polyurethane elastomer. The principal components of the resin are dicyclohexylmethane-4, 4'-diisocyanate and polyurethane polymer. In accord with the manufacture's instructions, resin and activator are mixed in a 1:1 ratio, by volume prior to be injected into the mold.

Another suitable casting material is available under the tradename Smooth-Cast, and this material is also manufactured by Smooth-On, Inc. The resin is also generally described as a polyurethane elastomer, and its principal components are 4, 4' methylene bis(phenylisocyanate) and butyl benzyl phthalate. Of course, the resin is also mixed with its corresponding activator just prior to injection into the mold.

With regard to the above exemplar thermoset casting resins, and many other resins that are commercially available, colorants may be added to obtain finished products of various colors and opacities.

It is also to be understood and appreciated that while the use of the present invention is described with regard to thermoset casting resins, it is understood and intended that the injection molding device of this invention is suitable for use in combination with other molding materials, particularly other materials having gas bubbles therein or such materials capable of being injected and cured at ambient temperatures.

Considering now the drawing figures, the view of FIG. 1 schematically illustrates a first embodiment of the injection molding device of this invention. Referring to FIG. 1, a source of resin is indicated at 10, and a source of activator/catalyst is shown at 12. Resin input line 14 may be used to fill the delivery vessel, generally indicated as 20. A mold is generally indicated as 16, and in the view of FIG. 1 mold 16 is disposed within a vacuum chamber 18. A resin conduit 22 is disposed in fluid-communicating relation between mold 16 and delivery vessel 20. In this first embodiment, operation of delivery vessel 20 is hydraulic and accomplished by hydraulic pump 24. Finally, a vacuum pump 26 is provided for the purpose of maintaining the interior of vacuum chamber 18 and mold 16 contained therein at sub-atmospheric pressure as the resin is injected into mold cavity 28. Of course, cavity 28 would be vented as by valve 29.

Figure 2:
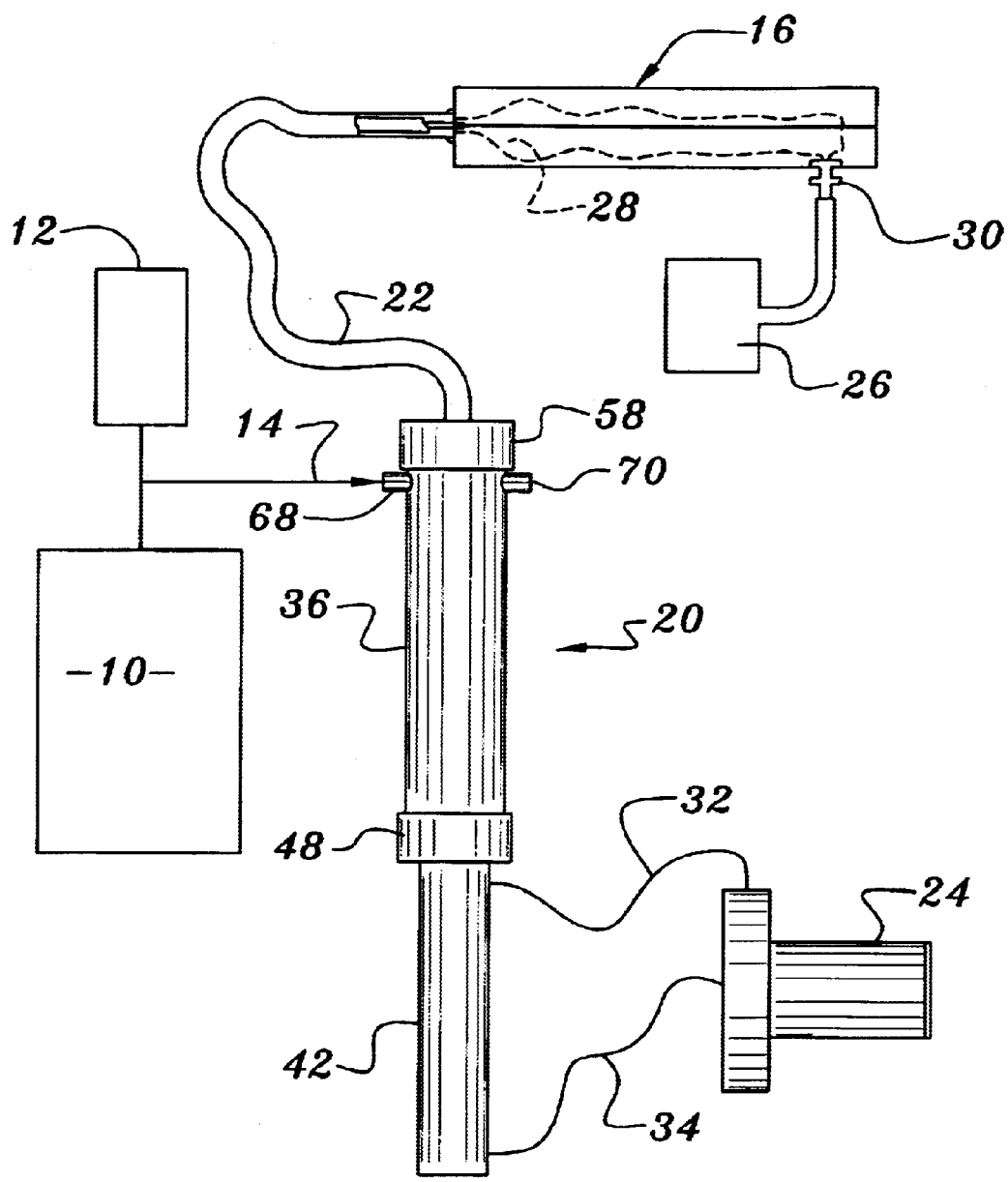
FIG. 2 is a plan view, partially in section, showing a second embodiment of the invention.

The view of FIG. 2 depicts a second embodiment wherein vacuum pump 26 is connected directly to mold cavity 28, rather than enclosing mold 16 within the vacuum chamber 18 shown in the view of FIG. 1. While maintaining sub-atmospheric pressure as resin is injected into the mold 16 is preferred, this is not considered to be a critical limitation to the scope of this invention. In actual practice one could eliminate vacuum pump 26 from either of these embodiments and simply vent the mold cavity 28 to atmosphere as by a fitting 30.

It is to be understood and remembered that the first and second embodiments of FIGS. 1 and 2 are exemplary only. All elements shown, with the exception of delivery vessel 20, are old and well known and may be provided in a variety of sizes, shapes and configurations. For example, while FIGS. 1 and 2 illustrate, schematically, the mixing of resin in source 10 with catalyst in source 12 and introduction of the resin mixture through resin input 14, this frequently would be accomplished by adding catalyst to resin according to the manufacture's instructions and pouring the mixture into the void of delivery vessel 20 as further described below. In addition, while the views of FIGS. 1 and 2 depict operation of delivery vessel by hydraulic pump 24 and its associated hydraulic lines 32 and 34, any one of a variety of known means could be used to actuate delivery vessel 20. For example, one might use a pneumatic pump, a mechanical screw, a lever, or even a push plate similar to that of a standard caulking gun. Inasmuch as it is delivery vessel 20 that defines the improvement provided by the present invention, attention is now invited to the detailed sectional view of FIG. 3.

Figure 3:
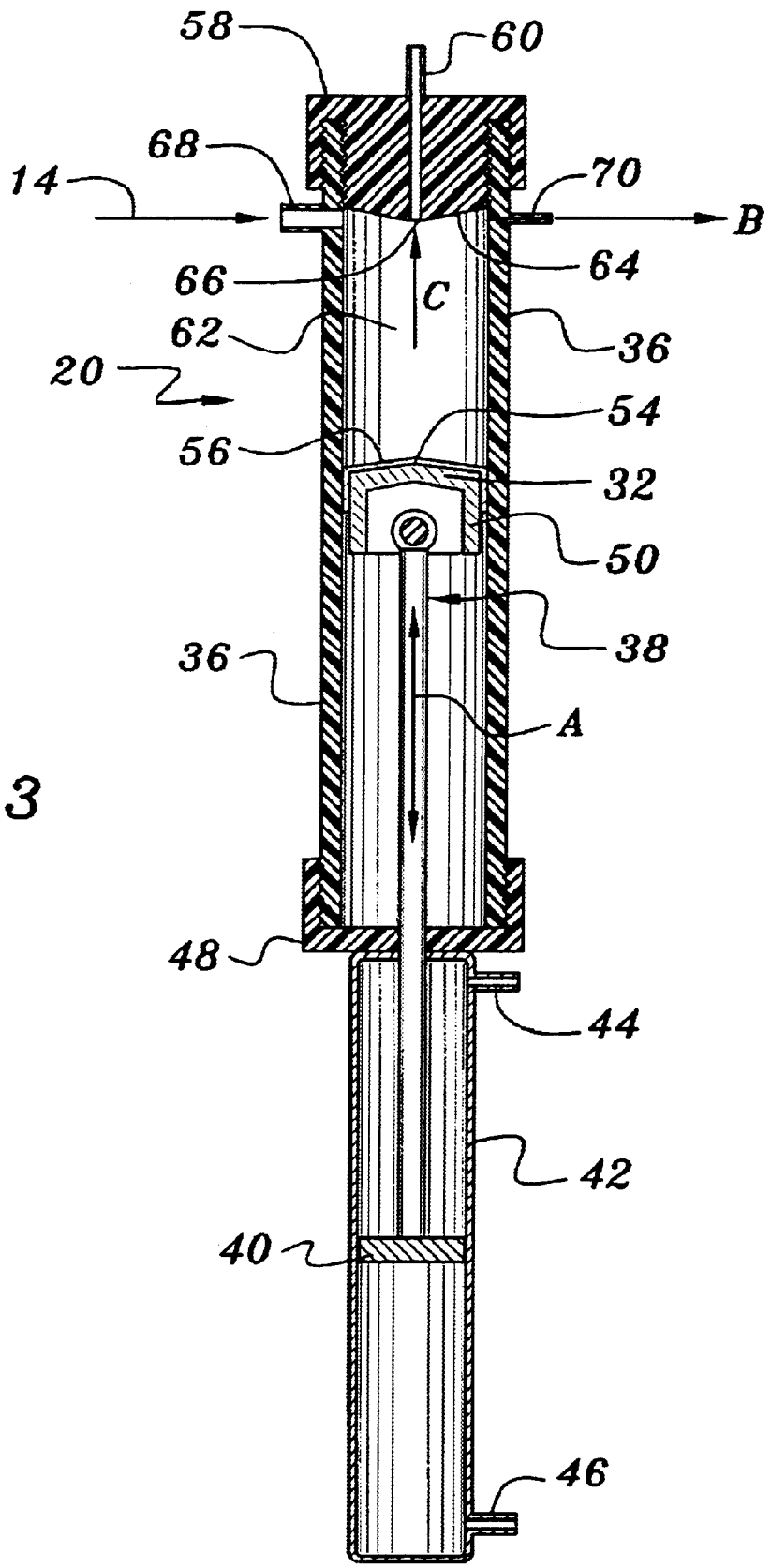
FIG. 3 is vertical cross section of the delivery vessel of both the first and second embodiments of the invention.

As shown in the view of FIG. 3, delivery vessel 20 basically comprises a piston. The outer body 36 of delivery vessel 20 is formed from a plastic material, and a moveable ram 38 is operatively disposed within outer body 36 for reciprocal movement as indicated by arrow A. Inasmuch as the embodiment illustrated in FIGS. 1–3 is hydraulic, one end 40 of ram 38 is disposed within hydraulic reservoir 42 whereby reciprocal movement of ram 38 is accomplished by the action of pump 24 passing and removing fluid through ports 44 and 46 in known fashion.

The end of outer body 36 adjacent reservoir 42 may be closed by any suitable means, such as, for example, bottom cap 48 which is shown as being screwed onto that portion of outer body 36.

Opposite from end 40 of ram 38 is distal ram end 50, the working surface of distal ram end 50 is convex to define a ram cone 52, the height of cone 52 being defined by its vertex 54. Ram cone 52 is covered by a rubber cap 56, portions of which engage the interior of outer body 36.

Opposite from bottom cap 48, outer body 36 is closed by body distal end 58. While any number of means for attaching body distal end 58 to outer body 36 may be used, the construction illustrated in FIG. 3 shows body distal end 58 screwed onto outer body 36. A resin aperture 60 extends through body distal end 58 in fluid-communicating relation to void 62 within outer body 36 and resin conduit 22 (FIGS. 1 and 2).

The interior surface of body distal end 58 is convex to define body cone 64 having a height defined by body cone vertex 66. Ram cone vertex 54 and body cone vertex 66 are in opposed relation to each other and the heights defined by ram cone vertex 54 and body cone vertex 66 are substantially equal. Furthermore, resin aperture 60 passes through body cone vertex 66.

In use, resin is admitted into void 62 for ultimate injection into mold cavity 28. In accord with the illustrations of FIGS. 1–3, the introduction of resin into void 62 may be accomplished through resin port 68. Attentively, body distal end 58 could simply be unscrewed and the resin poured into void 62. The figures further illustrate the provision of an exhaust port 70 that is also in fluid-communicating relation to void 62. Though not shown in the drawing figures, exhaust port 70 would preferably include a two way valve operable to permit fluid exhaust from within cavity 62, as indicated by arrow B.

In use, cavity 62 is filled with the working mixture of thermoset casting resin, and hydraulic pump 24 is actuated to advance distal ram end 50 toward body distal end 58, thereby injecting resin through resin aperture 60 as indicated by arrow C into mold cavity 28 (FIGS. 1 and 2). One can readily appreciate that as distal ram end 50 approaches body distal end 58, the volume of resin between ram cone vertex 54 and body cone vertex 66 will be less than the volume adjacent outer body 36 due to the opposing heights of the respective vertices. This structure is particularly important for two reasons. First, it is known that such thermoset casting resins include gases generated as a result of mixing the resin and its activator. Friction created by the contact of rubber cap 56 with plastic outer body 36 generates a positive electrostatic charge which attracts the negatively-charged gas bubbles and draws them away from resin aperture 60 toward outer body 36. This results in the injection of substantially bubble-free resin through resin aperture 60 and into the mold cavity 28. Thus, an article to be formed within mold cavity 28 will contain virtually no entrapped bubbles of gas, resulting in a finished product of extremely high quality.

Though not shown in the drawings, it is believed that an external device capable of enhancing the electrostatic attraction of outer body 36 to the gas bubbles could be added to the present invention, thereby improving not only the removal of such bubbles from resin injected into mold cavity 28, but also for enhancing the rate at which resin could be injected into that cavity 28.

In similar fashion, while these first and second embodiments of the invention disclose the use of a rubber cap 56, other suitable materials could be substituted for the rubber so long as such materials resulted in the creation of an electrostatic charge by the friction of the cap against outer body 36. Finally for the purpose of full and complete disclosure, the first and second embodiments illustrated in FIGS. 1 and 2 comprise an outer body of approximately two feet in length, and the stroke of moveable ram 38 is approximately fourteen inches. The diameter of void 62 is about four inches, thereby permitting an injection volume of resin of approximately one quart. Increasing the diameter of void 62 to as much as six inches would permit the injection of a resin volume of up to two gallons. The height of vertices 54 and 66 is each about 0.25 inches beyond the points of contact made by the respective perimeters of distal ram end 50 and body distal end 58.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described.

What is claimed:

1. In a device for injecting a thermoset casting resin in a mold at ambient temperature, the device including a source of the resin, a mold for receiving and curing the resin, a delivery vessel for injecting the resin into the mold, and a conduit in fluid communication between the mold and the delivery vessel, wherein the improvement comprises said delivery vessel defined by a piston, said piston comprising an outer body and a movable ram operatively disposed for reciprocal movement within said outer body, said outer body being formed from a plastic material and comprising a body distal end having an aperture formed therethrough in fluid-communicating relation to the conduit; said ram having a ram distal end in opposed relation to said body distal end, said ram distal end defining a ram cone having its vertex in opposed relation to said body distal end and a surface of said ram cone being rubber, whereby static electricity is generated as said ram cone advances toward said body distal end and the resin is delivered to the mold such that gas bubbles existing within the resin will be attracted to the plastic material forming the outer body, away from said aperture.

2. In a device as in claim 1, the improvement further comprising the body distal end comprising a body cone having its vertex disposed in opposing relation to said ram cone vertex and said aperture extending through said vertex of said body cone.

3. In a device as in claim 2, the improvement further comprising the height of said ram cone vertex and of said body cone vertex being substantially equal.

4. In a device as in claim 2, the improvement further comprising means for maintaining sub-atmospheric pressure within the mold as the resin is injected from the delivery vessel.

5. In a device as in claim 2, the improvement further comprising a vacuum chamber enclosing the mold, whereby the mold is maintained at sub-atmospheric pressure as the resin is injected from the delivery vessel.

6. In a device for injecting a thermoset casting resin in a mold at ambient temperature, the device including a source of the resin, a mold for receiving and curing the resin, a delivery vessel for injecting the resin into the mold, and a conduit in fluid communication between the mold and the delivery vessel, wherein the improvement comprises said delivery vessel defined by a piston, said piston comprising an outer body and a movable ram operatively disposed for reciprocal movement within said outer body, said outer body being formed from a plastic material and comprising a body distal end having an aperture formed therethrough in fluid-communicating relation to the conduit; said ram having a ram distal end in opposed relation to said body distal end, said ram distal end defining a ram cone having its vertex in opposed relation to said body distal end and a surface of said ram cone being rubber, and said body distal end comprising a body cone having its vertex disposed in opposing relation to said ram cone vertex, said aperture extending through said vertex of said body cone, whereby static electricity is generated as said ram cone advances toward said body distal end and the resin is delivered to the mold such that gas bubbles existing within the resin will be attracted to the plastic material forming the outer body, away from said aperture.

7. In a device for injecting a thermoset casting resin in a mold at ambient temperature, the device including a source of the resin, a mold for receiving and curing the resin, a delivery vessel for injecting the resin into the mold, and a conduit in fluid communication between the mold and the delivery vessel, wherein the improvement comprises said delivery vessel defined by a piston, said piston comprising an outer body and a movable ram operatively disposed for reciprocal movement within said outer body, said outer body being formed from a plastic material and comprising a body distal end having an aperture formed therethrough in fluid-communicating relation to the conduit; said ram having a ram distal end in opposed relation to said body distal end, said ram distal end defining a ram cone having its vertex in opposed relation to said body distal end and a surface of said ram cone being rubber, and said body distal end comprising a body cone having its vertex disposed in opposing relation to said ram cone vertex, said aperture extending through said vertex of said body cone, the height of said ram cone vertex and of said body cone vertex being substantially equal, whereby static electricity is generated as said ram cone advances toward said body distal end and the resin is delivered to the mold such that gas bubbles existing within the resin will be attracted to the plastic material forming the outer body, away from said aperture.

8. In a device as in claim 7, the improvement further comprising said surface of said ram cone that is rubber engaging said piston outer body as said movable ram advances toward said body distal end.

* * * * *